Patented Aug. 4, 1953

2,647,840

UNITED STATES PATENT OFFICE 2,647,840

IMPREGNATION OF LEATHER

René Oehler, Rockville, and Joseph R. Kanagy, Silver Spring, Md.

No Drawing. Application November 3, 1950, Serial No. 194,008

7 Claims. (Cl. 117—4)

(Granted under Title 35, U. S. Code (1952), sec. 266)

The invention described herein, if patented, may be manufactured and used by or for the Government for governmental purposes, without the payment to us of any royalty thereon.

This invention relates to the impregnation of leather, and more particularly to the impregnation of leather with rubber solutions of comparatively high solids concentration and comparatively low viscosities.

It is well known that the desirable properties of leather can be enhanced by impregnation with rubber, particularly with regard to water resistance. However, rubberized leather, as heretofore known, has not been satisfactory in several respects, a chief drawback being the unequal distribution of the rubber in the leather. A heavy rubber deposit on the leather surface, with little or no rubber deposit in the interfiber space in the center region, will naturaly fail when the surface deposit is worn away by scuffing. A further obstacle in the path of the development of rubberized leather capable of withstanding severe wear and tear, e. g., sole leather, is the difficulty of depositing a sufficient quantity of rubber in the leather.

It has been attempted heretofore to overcome these obstacles by lowering the viscosity of conventional rubber solutions. This approach, while basically sound, has failed to reach completely satisfactory results chiefly because the solids concentration of the solutions was so low that not enough rubber was deposited from these low viscosity solutions in the leather to afford sufficient protection.

The present invention which overcomes the above-outlined shortcomings has a principal object of providing leather, particularly sole leather of superior water resistance and abrasion resistance.

A further object of the present invention is a process of impregnating leather with rubber solutions so that the rubber penetrates throughout the thickness of the leather.

Another object of the present invention is a rubber solution for leather impregnation, characterized by low viscosity and high solids concentration, and capable of thoroughly penetrating the leather and depositing substantially all the solids therein.

Yet another object of the present invention is the utilization of grades of leather heretofore considered inferior and unsuitable for shoe leather, e. g. "belly cuts."

Other objects and advantages of the present invention will become apparent from the following description.

Briefly, it was found that a rubber solution having the requisite low viscosity and high solids concentration for impregnating leather in accordance with the present invention is obtained by masticating natural rubber, preferably followed by catalytic oxidation of the milled rubber, and dissolving the masticated rubber in an appropriate organic rubber solvent. As will be more fully explained, rubber solutions obtained in this manner are of sufficiently low viscosity, 100 poises or less, to be capable of penetrating the interfiber space of the leather and at the same time are sufficiently concentrated, e. g. 20–40% rubber content or even higher, to carry an adequate amount of rubber into the leather.

It was also determined that a desirable temperature range for applying the foregoing rubber solutions to leather is in the order of about 50–80° C. While it is not to be understood that 80° C. is a hard-and-fast limit, it is undesirable to exceed a temperature at which the leather is damaged, or at which vulcanization of the rubber takes place while still in solution. The chief advantage of employing an elevated temperature, but short of a harmful range, is a further lowering of the viscosity of the solution without reducing the solids concentration. However, said results are obtained by immersing the leather at room temperature into concentrated rubber solutions of sufficiently low viscosity.

Substantial evenness of distribution of the rubber throughout a piece of leather of comparative thickness, such as sole leather, is obtained by splitting off a thin layer on the grain side of the leather. There appears to exist a barrier zone at and immediately below the surface of the leather, close to the grain surface, which blocks the penetration of the rubber solution to the center region. In other words, while apparently satisfactory quantitative rubber depositions are obtained in unsplit leather, the center region of the leather has little rubber deposit. On the other hand, leather from which a thin grain layer is split off prior to rubber impregnation, shows a much more even distribution of the rubber throughout its thickness and markedly superior abrasion resistance even after the top layer was worn off by the abrading machine.

As far as we are aware, all kinds of unfilled commercial leather now on the market are capable of rubber impregnation treatment in accordance with our invention. The more expensive types and grades of leather, such as chrome-retanned shoe upper leather and vegetable tanned sheep skin give highly satisfactory deposition results. Of particular importance, however, are the favorable results obtained with sole leathers, e. g. vegetable tanned crust leather and ungreased chrome-retanned sole leather.

Likewise, a wide variety of commercially available natural rubbers may be used for making up rubber solutions for leather impregnation. Among typical natural rubbers are Castilloa, Hevea (smoked sheet, or pale crepe), guayule, balata, guttapercha.

The following are typical examples of rubber solutions suitable for leather impregnation in accordance with our invention.

A 300 gram batch of smoked sheet Hevea rubber was passed through a rubber mill for three preliminary passes at a roll clearance of .054", .036" and .018"; temperature of the rolls being about 70-80° F. The rolls were then set at .003", and the rubber passed through and rolled up ten times without banding. Each pass was begun by placing one end of the rubber roll in the mill so as to obtain uniform mixing by virtue of the cross milling. After ten passes, with the mill still set at 0.003", the rubber was banded for one minute, and 4½ grams of mercaptobenzothiazole was added over a period of ½ minute, and the banded milling continued until the total time of banded milling was 3 minutes. During this period the roll temperature sometimes rose to 95° F. The mill rolls were allowed to cool, and the rubber was milled further. After about 90 passes at .003" clearance it was found that the rubber began to stick to the rolls and milling was therefore stopped at that point.

The rubber mill had the following specifications: Roll diameter, 5¾ inches; roll length, 12 inches, speed of front roll, 22 R. P. M.; ratio of roll speeds, 4:3; differential of peripherial speeds of rolls, 65 inches per minute.

The mercaptobenzothiazole acts as a peptizing or oxidizing agent for the rubber being masticated. Among other rubber peptizing agents suitable for the preparation of rubber impregnating compositions in accordance with the present invention are mercaptoarylthiazoles such as mercaptonaphthothiazole; lower alkyl mercaptothiazoles, e. g., a mixture of ethyl and dimethyl mercaptothiazoles; and aryl mercaptans, such as naphthyl beta mercaptan. However, by mechanically masticating the rubber sufficiently thoroughly, the plasticity necessary for preparing rubber solutions of the desired concentration and viscosity for leather impregnation in accordance with the present invention may be obtained without the addition of a peptizing agent; it is postulated that oxidation of the rubber is caused by mechanical mastication, although we do not wish to be understood to base the results of the mastication on this particular hypothesis. It was found that by using the peptizing agents listed herein, the proper degree of plasticity of the rubber may also be obtained with a hot mill (e. g. at about 240° F.); in the case of naphthyl beta mercaptan approximately 50 minutes hot milling were required to obtain the proper plasticity of the rubber, and in the case of a mixture of ethyl and dimethyl mercaptothiazoles approximately 70 minutes hot milling. The amounts of peptizing agent to be added to the rubber may, for instance, be of the order of .75-1.5% of the weight of the rubber.

The following hot milling procedure was used: With the mill at 240° F. and the roll clearance at 0.054 inch, a 300-gram batch of rubber was placed on the mill. As soon as the rubber could be banded, the first portion of peptizing agent was added; milling time was counted from this stage. After 30 minutes milling the first sample was removed and then the second portion of peptizing agent was added. After the 40 minute sample was removed the mill rolls were set at 0.036 inch, and after the 60 minute sample was taken the mill rolls were set at 0.018 inch. As the milling continued, the rubber became progressively more sticky. Toward the end of the milling, the rubber transferred to the back mill roll. About ⅗ of the peptizing agent was added during the first stage, and about ⅖ during the second stage.

The same cold and hot milling procedures were successfully repeated with pale crepe Hevea, Castilloa, guayule.

The degree of plasticity imparted to the rubber by degrading in accordance with the foregoing description bears a close relation to the viscosity of the solution prepared therefrom. It is well known that the viscosity of a solution of a high polymer is a function of its molecular weight. In fact, the measurement of solution viscosities of polymers is one method for estimating molecular weight. Another method of measuring the extent of degradation of rubber is by means of plastometers. It was found by measurements on a modified Scott plastometer (manufactured by the Scott Manufacturing Company, modified by Ro-Search, Inc., Waynesville, N. C.), that rubber milled to a plasticity of 11 or less, preferably between about 8 and about 10, is sufficiently degraded to be used in the preparation of rubber solutions for the practice of the present invention. Viscosity measurements of 30% solutions in toluene of rubbers of this plasticity range show that the viscosity of the solution is directly proportional to the plasticity of the rubber. The viscosity measurements of the solutions were carried out with a Gardner bubble viscosimeter at room temperature (73° F.); the number of seconds required for the bubble to rise in the Gardner viscosimeter can be approximately converted to poises by dividing the number of Gardner seconds by 1.6. The viscosity of 30% toluene solution was found to be 20 Gardner seconds in the case of rubber degraded to a modified Scott plasticity of 8; 60 seconds with rubber degraded to a modified Scott plasticity of 10; and 80 seconds in the case of a modified Scott plasticity of 11. The relation of the modified Scott plasticity of the degraded rubber and of the viscosity in Gardner seconds of a 30% toluene solution prepared therefrom may thus be expressed, within this range, as Viscosity of sol.=(20×modified Scott plasticity of degraded rubber)−140

While the foregoing equation is based on measurements with a commercial plastometer and viscosimeter, neither of which was calibrated in terms of the c. g. s. system, the same basic relationship between plasticity of degraded rubber and viscosity of solution prepared therefrom will be found if the measurements are converted into poises.

The following table shows the viscosity of solutions of representative samples of the degraded rubbers in various organic rubber-solvents; the viscosities are expressed in seconds, measured with the Gardner bubble viscosimeter at 73° F.

TABLE I
Viscosities of rubber solutions

| Solvent | 30 Percent solutions from 50-pass Castilloa | Solutions from 90-pass Hevea, Percent Solids | | |
|---|---|---|---|---|
| | | 20 | 30 | 40 |
| Benzene | 12 | | 17 | |
| Toluene | 10 | 2 | 14 | 56 |
| Toluene with 4 percent Ethanol | | | 10 | 41 |
| Toluene with 8 percent Ethanol | | 2 | 9 | |
| Gasoline | | 2 | 9 | |
| Gasoline with 4 percent Ethanol | | | 6 | |
| Gasoline with 8 percent Ethanol | | 2 | 6 | |
| Xylene | | | 11 | |
| Stoddard solvent | 10 | 2 | 10 | 48 |

It appears from the foregoing table that liquid hydrocarbon solvents such as benzene, tolene, gasoline, Stoddard solvent and xylene are suitable rubber solvents for the preparation of solutions of masticated rubber, possessing the desired viscosity and concentration. The addition of a small amount of ethyl alcohol (which, per se, has no appreciable solvent effect on the rubber) to the hydrocarbon solvent has the desirable effect of reducing the viscosity of the solution. With non-hydrocarbon rubber-solvents, it was found that the viscosity of a 30% solution of 90-pass Hevea in 1,2,dichloroethane is 31 Gardner seconds; in chloroform, 64 seconds; and in carbon tetrachloride 186 seconds (the latter viscosity, which corresponds to about 112 poises is undesirably high).

The following examples show the quantitative results with regard to rubber deposition in leather impregnated with solutions prepared as above. A method used for impregnating the leather was to dry the leather at, e. g. 80° C., immersing the dried leather in the solution for a predetermined time and at a predetermined temperature, removing the leather from the solution, wiping off the excess solution and evaporating the solvent. The rubber deposit was calculated by comparing the weight of the untreated leather with the weight of the impregnated leather after evaporation of the solvent. It was found that with toluene as the solvent, 99% complete evaporation could be obtained in a forced draft oven at 80° C. after 5 hours, and 99.5% complete in 24 hours. Air-dried leather may also be impregnated.

The amount of rubber deposited is greater at immersion temperatures near 80° C. than by immersion at room temperature. The reason for this is postulated to be the lower viscosity of a heated solution. The time of immersion was also found to be important, particularly in the case of rubber solutions of 30% concentration and higher. However, satisfactory resuts can be obtained, e. g. with air-dry or oven-dry degrained vegetable tanned crust leather immersed in rubber solutions at room temperature.

Thus, by impregnating vegetable-tanned crust leather at various temperatures, the following results were obtained with Castilloa rubber solutions:

TABLE II
Impregnation of vegetable tanner crust leather with benzene solution of Castilloa rubber

| Immersion | | 20 Percent Solids | | 30 Percent Solids | | 40 Percent Solids | |
|---|---|---|---|---|---|---|---|
| Time, hr. | Temperature, °C. | Solution absorbed | Rubber deposited | Solution absorbed | Rubber deposited | Solution absorbed | Rubber deposited |
| | | Percent | Percent | Percent | Percent | Percent | Percent |
| 3 | 78 | 47.2 | 7.2 | 30.1 | 6.8 | 18.3 | 5.3 |
| 22 | 78 | 53.0 | 9.5 | 51.6 | 14.5 | 37.8 | 13.3 |
| 22 | 39 | 56.4 | 10.0 | 44.2 | 11.7 | 28.4 | 8.8 |
| 1 48 | 50 | | | 39.3 | 11.1 | | |
| 2 48 | 50 | | | 47.7 | 14.0 | | |

1 30-pass rubber, solution viscosity 155 Gardner seconds.
2 50-pass rubber, solution viscosity 37 Gardner seconds.

Generally speaking, in order to be considered a satisfactory rubber deposition, the amount of rubber deposited in the leather has to exceed 8%; to obtain the desired degree of water resistance and abrasion resistance, rubber deposits of 11–25% appear preferable; rubber deposits above 25% are difficult to obtain and do not sufficiently add to the desirable qualities of the impregnated leather, as compared with leather carrying lesser rubber deposits in its interfiber space, to make the additional effort worthwhile in most cases.

Degreased chrome-retained sole leather was impregnated for 16 hours with a solution of 35-pass Castilloa rubber, the solution having a viscosity of 12 seconds (measured with a Gardner bubble viscosimeter at 73° F.), and a rubber deposit of 20.6% was attained; with 25-pass rubber (solution viscosity 35 seconds), the deposit was 16.9%. In another series of runs, vegetable-tanned crust leather discs were impregnated with solutions of milled Hevea smoked sheet rubber in toluene at 80° C., with the following results:

TABLE III

| | Immersion Time, Hrs. | Solution Viscosity, Seconds (at rm. temp.) | Solution Absorption | Rubber Deposit |
|---|---|---|---|---|
| | | | Percent | Percent |
| a. 30% Solution of 45-pass rubber | 26 | 50 (average) | 44.8 | 11.3 |
| | 48 | | 49.9 | 13.1 |
| b. 30% Solution of 90-pass rubber | 5 | 12 (average) | 49.6 | 14.1 |
| | 16 | | 53.4 | 14.8 |
| | 26 | | 55.2 | 14.6 |
| | 48 | | 55.7 | 15.1 |
| | 140 | | 54.7 | 16.1 |
| c. 40% Solution of 90-pass rubber | 5 | 50 (average) | 40.7 | 15.5 |
| | 16 | | 42.5 | 16.3 |
| | 26 | | 49.4 | 18.1 |
| | 49 | | 54.8 | 21.7 |
| | 140 | | 55.8 | 22.6 |

It appears from the foregoing table that generally speaking, the absorption and deposition gain after 26 hours is small except in the case of solutions of the order of 40% solids concentration. However, it is clearly apparent that solutions of the order of 40% solids concentration deposit more rubber than low concentrations. As heretofore pointed out, highly concentrated rubber solutions must employ thoroughly milled rubber because otherwise the viscosity of the solution would be too high to permit successful impregnation of the leather. At viscosities above 60 Gardner seconds, the solutions become increasingly difficult to work with, and the difficulty becomes pronounced above about 70 Gardner seconds. The upper viscosity limit for rubber solutions useful for the purpose of the present invention is about 160 Gardner seconds (100 poises).

The deposited rubber may also be vulcanized. To effect vulcanization the leather and immersion bath may be at room temperature. A typical rubber solution, for each 100 parts of rubber contains 2 parts zinc stearate, 1 part zinc oxide, 2 parts sulfur, 1.5 parts mercaptobenzothiazole added on the mill and 3 parts of a low temperature accelerator of the dithiocarbamate type added before the immersion.

In order to effect a more uniform distribution of the rubber throughout the leather, a thin layer is split off from the grain side of the leather, e. g. of the order of .02–.08″. The split off layer should be thick enough to include the barrier zone between flesh and grain side which lessens the rubber penetration from the grain side. While the gross amount of rubber deposited in the leather is not substantially affected by the presence or absence of the grain layer, the amount of rubber present in the inner region of the leather is substantially increased by the absence of the grain layer. The grain layer has very poor abrasion resistance, and so there is practically no loss in the wear of sole leather by degraining. The time of treatment is also substantially shortened by the preliminary splitting off of the grain layer; i. e. a high percentage of rubber is deposited in a much shorter time of immersion.

The following table illustrates results obtained with a 40% Hevea rubber solution and vegetable tanned crust leather:

TABLE IV

| Immersion Time (hours) | Percent rubber solution absorbed— Unsplit Sole | Percent rubber solution absorbed— Sole (without Grain Layer) |
| --- | --- | --- |
| 3 | 17 | 40 |
| 7–8 | 28 | 43 |
| 21–24 | 37 | 45 |
| 48 | 40 | |

The split leather (last column of the foregoing table) has a .045″ leather removed from the grain side prior to immersion. In each case, absorption efficiency was 96–100%; i. e. 96–100% of the solids contents of the rubber solution was deposited in the leather. Thus, after 7–8 hours immersion of the split leather, about one and a half times as much rubber solution was absorbed therein than in the unsplit leather during the same immersion period. This shortened time of treatment for the split leather is an additional process economy.

Chrome retanned shoe upper leather was impregnated with a toluene solution of milled Hevea rubber of a 40% solids concentration and a viscosity of 45 seconds; the amount of rubber deposited after 16 hours immersion was 32.3%. Vegetable tanned sheep skin leather was treated in the same manner; the rubber deposit was 53.9%.

90-pass pale crepe Hevea rubber solutions in toluene of, respectively, 30% and 40% solids concentration were used for the impregnation of vegetable tanned crust leather by regular immersion and also by immersion at a vacuum of 1 mm. Hg. No significant difference between the results obtained at atmospheric pressure and under vacuum conditions was observed. The amount of rubber deposited after 22 hours from a 30% solution was 15.2%, and the amount of rubber deposited from a 40% solution was 22.1%. From a 20% solution only 9.8% deposit was accomplished.

The rubber impregnated leathers were tested for water vapor permeability, which is a desirable property of shoe leather in that it promotes foot comfort; thus, while an all rubber boot is water impermeable its water vapor impermeability renders the boot sweaty and uncomfortable. It was found that the rubber impregnated leathers showed less decrease in water vapor permeability than leather treated with stuffing greases. The water vapor permeability of an untreated leather sample was measured at .48 gm. per 25 cm.$^2$ per 100 minutes. The same leather carrying a 11% rubber deposit had a water vapor permeability of .35–.38 gm.; and with a 26.5% rubber deposit the water vapor permeability was .19–.22 g. By comparison, stuffed leather carrying 12.8% grease introduced therein by the solvent method had a water vapor permeability of .37 gm., and with 22% grease, the water vapor permeability was .09 g.

Water permeability of the rubber-impregnated leather produced in accordance with the present invention was tested with an absorption meter designed to measure water absorption under conditions imitating walking. The test apparatus flexes the leather sample at regular frequent intervals and during each flexing presses the sample against a wet sponge. The water absorption of the sample can be determined by intermittent weighing. Water transmission can be measured with the same apparatus, by placing a wick (e. g. of blotting paper) on the side of the leather opposite the wet sponge for determining the amount of water taken up by the wick. High water absorption in a sole is obviously undesirable in that it causes damp feet, and high water transmission is even more objectionable.

The following table shows water absorption and transmission results determined in a typical leather sample (chrome retanned sole leather carrying 12% rubber deposit from a solution of highly milled Castilloa rubber); the amount of water absorption and transmission is indicated in grams of water in a 2 x 6″ leather strip.

TABLE V

| No. Flexes | Untreated Leather | | Treated Leather | |
| --- | --- | --- | --- | --- |
| | Absorption | Transmission | Absorption | Transmission |
| 500 | 5 | | .5 | |
| 1,000 | 10.5 | 3 | 2 | .2 |
| 2,000 | 14.5 | 6 | .4 | 1.5 |
| 3,000 | 15.5 | 8.5 | 5.5 | 4 |
| 4,000 | 16 | 11 | 7 | 5 |
| 5,000 | 16.5 | 13 | 8.5 | 6.5 |

It will be seen from the table that even after 5000 flexes, water absorption and transmission of the rubberized sole is only about one-half as compared with an untreated sole, while at 1000 flexes water absorption and transmission of the treated sole is only a small fraction of the untreated sole. Inasmuch as one flex in the test apparatus corresponds to one step in the actual use of the shoe sole, 1000 flexes correspond to a walk of approximately one mile, assuming that the same foot (left or right) strikes the ground at a distance of 5.28 feet; thus, in a five-mile walk (5000 flexes) over wet ground in a pair of shoes whose soles are treated in accordance with the present invention, the amount of water transmitted is approximately the same as the amount of water transmitted through a pair of untreated soles in the course of a two-mile walk.

Abrasion resistance of leather soles, rubber impregnated in accordance with the present invention, was determined in accordance with Federal specification KK–L–311. A standard abrasion machine of the National Bureau of Standards was used; a machine of this type is illustrated in the foregoing specification at page 52 and described at pages 22/23, and essentially consists of an abrasion wheel with constant torque mechanism and a Prony brake. The following test results are based on a wheel for which a load of 26 pounds is required to lift the same, and the Prony brake has a 10 pound load (the corresponding figures in specification KK–L–311 being 36 pounds and 20 pounds, respectively).

In one test with vegetable tanned crust leather impregnated with milled Castilloa rubber, the samples being of an average thickness of slightly less than .25″, the following figures represent average abrasion losses in inches taken from four samples in each instance:

TABLE VI

| Revolutions | Untreated Leather | Leather with 11% Deposit of 30 Pass Castilloa Rubber | Leather with 14% Deposit of 50 Pass Castilloa Rubber |
|---|---|---|---|
| 4,000 | .061 | .041 | .038 |
| 8,000 | .095 | .068 | .063 |
| 12,000 | .122 | .097 | .089 |
| 16,000 | .143 | .114 | .103 |
| 20,000 | .175 | .135 | .125 |

It appears from the foregoing table that the abrasion loss becomes less as the amount of rubber deposited in the leather increases. The amount of rubber that can be deposited in the leather in turn largely depends on the degree of milling to which the rubber was subjected prior to being placed in solution. Thus, the abrasion loss of the sample impregnated with 50 pass rubber was 28½% less than the abrasion loss of the untreated sample after 20,000 revolutions; the abrasion loss of the untreated sample after 12,000 revolutions was the same as the abrasion loss of the treated sample after 20,000 revolutions, corresponding to an improvement of 66⅔%.

In another series of tests, the abrasion resistance of vegetable tanned crust leather treated with milled Hevea rubber was determined. The leather samples used in these tests had an average thickness of about .275″. One set of treated leather sample was unsplit leather, while two sets of samples represented leather from which a thin grain layer was split off prior to immersion in the rubber solution. The unsplit samples carried a 13% deposit of 90 pass Hevea rubber; the first set of the "split" samples from which the grain layer had been removed carried a 13% deposit of 35 pass Hevea rubber, and the second set of the "split" samples carried an 18% deposit of 90 pass Hevea rubber. The following table expresses the abrasion losses in fractions of inches; each figure represents the average of 3 values.

TABLE VII

| Revolutions | Untreated Leather | Unsplit Leather, 19% Deposit of 90 Pass Hevea Rubber | Split Leather, 13% Deposit of 35 Pass Hevea Rubber | Split Leather, 18% Deposit of 90 Pass Hevea Rubber |
|---|---|---|---|---|
| 4,000 | .054 | .022 | .010 | .010 |
| 8,000 | .086 | .043 | .033 | .024 |
| 16,000 | .111 | .062 | .051 | .039 |
| 24,000 | .134 | .081 | .068 | .055 |
| 32,000 | .161 | .123 | .098 | .082 |

It will be noted from the above table that substantial reductions of the abrasion loss were observed in all treated samples and that the split leather samples consistently showed the least abrasion loss. It was particularly surprising that the split samples carrying a 13% rubber deposit showed better abrasion resistance than the unsplit samples carrying a 19% rubber deposit. The abrasion loss of the samples carrying an 18% rubber deposit was on the average less than half the abrasion loss of the untreated samples at the same number of revolutions, and the abrasion loss after 32,000 revolutions of the split samples carrying an 18% deposit was less than the abrasion loss of the untreated samples after only 8,000 revolutions. A marked improvement in abrasion resistance was also noted in the case of the unsplit rubber-impregnated samples, although not as pronounced as in the case of the split samples; thus, the average abrasion loss of the unsplit samples carrying a 19% Hevea rubber deposit was less than after 24,000 revolutions than the abrasion loss of an untreated sample after 16,000 revolutions.

In a series of tests for abrasion resistance of vegetable tanned crust leather carrying a 15% deposit of Hevea rubber vulcanized in situ, it was found that the abrasion resistance was substantially identical with the abrasion resistance of samples carrying the same amount of unvulcanized Hevea rubber deposit. The vulcanized samples were stiffer than the unvulcanized samples.

The term "milled rubber" as used herein, is intended to apply to masticated rubber irrespective of the type of apparatus which performs the mastication; thus, rubber milled by rollers and rubber masticated in a mixer, e. g. of the Banbury type, are within the contemplation of the present invention.

Reference is made to copending application Serial No. 194,007, "Rubber Compositions for Treaded Leather," filed concurrently, René Oehler.

It appears from the foregoing description of representative examples of the practice of our invention that we have succeeded in depositing large amounts of milled rubber in leather, including leather of the sole leather type, and have greatly increased the water resistance and abrasion resistance of the leather, without destroying its water vapor permeability and other desirable characteristics. We do not wish to be understood to limit the scope of our invention by particular details contained in the foregoing examples inasmuch as departures and modifications within the spirit of our invention will readily occur to the expert. We desire to claim our invention broadly and to limit its scope by the appended claims.

We claim:

1. The process of impregnating leather with rubber, comprising splitting a thin layer from the grain side of the leather and immersing the remainder of the leather into a solution of masticated rubber at a temperature from about 50° C. to about 80° C., said solution having a rubber solids concentration of at least about 30% and a viscosity at room temperature of between about 6 and about 160 Gardner bubble viscosimeter seconds.

2. The process of impregnating leather with rubber, comprising splitting a thin layer from the grain side of the leather and immersing the remainder of the leather into a solution of masticated rubber at a temperature from about 50° to about 80° C., said solution having a rubber solids concentration of at least about 30% and a viscosity at room temperature between about 6 and about 70 Gardner bubble viscosimeter seconds.

3. The process of impregnating leather with rubber, comprising splitting a thin layer from the grain side of the leather, drying the remainder of the leather at an elevated temperature not exceeding about 80° C. and immersing it into a solution of masticated rubber at a temperature from about 50° C. to about 80° C., said solution having a rubber solids concentration of at least about 30% and a viscosity at room temperature of between about 6 and 160 Gardner bubble viscosimeter seconds.

4. The process of impregnating leather with rubber, comprising splitting a thin layer from the grain side of the leather, drying the remainder of the leather at an elevated temperature not exceeding about 80° C. and immersing it into a solution of masticated rubber at a temperature from 50° C. to about 80° C., said solution having a rubber solids concentration of at least about 30% and a viscosity at room temperature of between about 6 and about 70 Gardner bubble viscosimeter seconds.

5. The process of impregnating leather with rubber according to claim 1, wherein the thickness of the split-off grain layer is from about .02″ to about .08″.

6. The process of impregnating leather with rubber according to claim 1, wherein the thickness of the split-off grain layer is about .045″.

7. Degrained leather impregnated with rubber by the process according to claim 1.

RENÉ OEHLER.
JOSEPH R. KANAGY.

References Cited in the file of this patent

UNITED STATES PATENTS

| Number | Name | Date |
|---|---|---|
| 795,076 | Steinharter | July 18, 1905 |
| 970,734 | McLennan | Sept. 20, 1910 |
| 1,571,973 | Shivel et al. | Feb. 9, 1926 |
| 1,677,435 | Dunham | July 17, 1928 |
| 2,018,645 | Williams et al. | Oct. 22, 1935 |
| 2,064,580 | Williams | Dec. 15, 1936 |
| 2,202,092 | Conant | May 28, 1948 |

FOREIGN PATENTS

| Number | Country | Date |
|---|---|---|
| 721,002 | France | Feb. 26, 1931 |

OTHER REFERENCES

Rubber Age (N. Y.), vol. 66 of Dec. 1949, page 311.